United States Patent Office 2,701,813
Patented Feb. 8, 1955

2,701,813
PROCESS FOR THE PARTIAL OXIDATION OF OLEFINS TO FORM GLYCOLS AND ESTERS THEREOF

John C. Snyder, Darling, Pa., assignor to Houdry Process Corporation, Wilmington, Del., a corporation of Delaware No Drawing. Application March 8, 1951, Serial No. 214,623

3 Claims. (Cl. 260—497)

This invention relates to a process for the partial oxidation of olefins and more particularly to the production from olefins of di- and polyhydric alcohols and their esters, such as glycol, glycol diacetate, 1,2-cyclohexenediol and its esters, etc.

It is known that ethylene and its higher homologues and substituted mono-olefins can be subjected to mild or partial oxidation by molecular oxygen in the presence of suitable oxidation catalysts to form the corresponding dihydroxy hydrocarbons or glycols. Side-reactions, however, also occur, with the resultant formation, for instance, of more highly oxidized compounds such as organic acids, aldehydes and/or ketones, polymers, and the like.

It is an object of the present invention to produce di- and polyhydric alcohols, such as glycols, their derivatives and esters by partial oxidation of olefins while inhibiting to major extent the formation of higher oxidation products. Further objects will appear from the following specification and the annexed claims.

I have found that the formation of undesirable by-products can be inhibited to a substantial degree, if the mild or partial oxidation of the olefins by molecular oxygen in the presence of the usual oxidation catalysts is carried out in the presence of certain acids, particularly organic acids, in suitable excess. These acids combine with the hydroxyl groups of the glycols or the like, immediately on their formation, with the result that said hydroxyl groups are esterified and thereby protected against further oxidation or other transformation, the esters being substantially more resistant to further oxidation than the free hydroxyl groups. Considerably higher yields of glycols and the like on their esters are thus obtained than by the known process, i. e. without the use of esterifying acids in the partial oxidation of olefins. The directly resulting esters can be transformed into the corresponding free di- or polyhydric alcohols by known methods, if so desired.

Not only can dihydric alcohols and their esters be produced by this process, but also polyhydric alcohols and their esters, if di- or poly-olefins are employed as the starting materials instead of mono-olefins.

Any acids can be used for esterifying the hydroxyl compounds first formed which are capable of forming esters therewith and which do not disturb the reaction in any other direction. Best suited are such acids which are miscible with or solvents for the olefins employed. Mineral acids, on the other hand, tend to promote polymerization of olefins under the reaction conditions, dehydration or other side-reactions, and are best avoided. Organic carboxylic acids are preferred, including for example acetic acid, propionic acid, butyric acid, oxalic acid, benzoic acid and the like. A substantial molar excess of the acid over that stoichiometrically required for full esterification of all the hydroxyl groups formed, i. e. three mols of acid per mol of mono-olefin, is recommended as a minimum. Excessive quantities of acid as in proportions greater than 6 mols per mol of mono-olefin appear to furnish no additional benefits; and in some instances may be even undesirable. It will be understood that with compounds containing two or more double bonds the recommended or minimum quantity of acid is increased so as to provide at least one mol of acid in excess of that required for furnishing the esterifying groups.

Catalysts useful in the partial oxidation of olefins with formation of the corresponding di- or polyhydric alcohols are certain metals and metal compounds, such as silver, compounds of metals of the first transition group of the periodic system, particularly their salts, and, generally, salts of such heavy metals which are capable of existing in more than one oxidation state, such as the acetates, stearates, and naphthenates of cobalt, manganese, copper, and the like. If salts of these groups of metals are employed, the acidic radical thereof can be, but need not necessarily be, that of the acid used for the esterification of the forming glycol compound, e. g. that of acetic acid. It is only important in this respect that the metal salt employed as catalyst will mix with or dissolve in the acid used; but the use of the same acid radical in the catalyst salt and in the esterifying acid is preferred. Metals or metal oxides can be employed particularly insofar as their salts will be formed by reacting under the prevailing conditions with a portion of the acid added in excess for the formation of the glycol esters, or the like.

The partial oxidation of the olefins with accompanying esterification of the hydroxyl groups of the intermediate compounds can be carried out at about such elevated temperatures as are usually employed in such partial oxidation reactions without accompanying esterification; said temperatures depending, at least in part, on the kind of olefin employed and on the pressure used. Temperatures between 50° and 250° C. are generally suitable for this purpose. The pressure employed may preferably be such that liquid phase oxidation is ensured.

Example I

One mol of 2-butene is mixed with 4 mols of acetic acid and about 0.5% by weight of cobalt acetate based on the butene used. The mixture is treated with molecular oxygen or gases containing free oxygen, such as air, at a temperature of about 160° C. and under increased pressure such that the reaction takes place in the liquid phase. 2,3-butylene glycol diacetate is produced in good yields. It can be transformed, if so desired, into the free glycol compound by usual methods, such as saponification by means of alkali with subsequent decomposition of the initially resulting alkali salts by mineral acid.

Example II

One mol of cyclohexene mixed with 6 mols of glacial acetic acid and saturated with manganous acetate is subjected to partial oxidation with molecular oxygen at a temperature of about 180° C. under otherwise corresponding conditions as indicated in Example I. 1,2-cyclohexenediol diacetate is obtained as a major reaction product.

Obviously many modifications and variations of the invention as hereinbefore set forth may be made without departing from the spirit and scope thereof.

I claim as my invention:

1. A process for partially oxidizing a butylene feed material containing butene-2 which comprises treating butylene feed material in the presence of cobalt acetate and at least three mols of acetic acid per mol of butylenes with a free oxygen containing gas at a treating temperature between about 50° and 250° C. and a pressure sufficient to maintain a major portion of the butene-2 in the liquid phase.

2. A process for partially oxidizing 2-butene which comprises treating 2-butene feed material in the presence of cobalt acetate and about four mols of acetic acid per mol of 2-butene with a free oxygen containing gas at a treating temperature of about 160° C. and a pressure sufficient to maintain a major portion of the 2-butene in the liquid phase.

3. The process as defined in claim 2 wherein 2-3 butylene glycol diacetate, resulting from the partial oxidation of 2-butene in the presence of the acetic acid, is separated from the reaction mixture and is saponified to 2-3 butylene glycol, and the said 2-3 butylene glycol is recovered.

References Cited in the file of this patent

UNITED STATES PATENTS

| | | |
|---|---|---|
| 2,316,604 | Loder et al. | Apr. 13, 1943 |
| 2,497,408 | Gresham | Feb. 14, 1950 |
| 2,519,754 | Gresham | Aug. 22, 1950 |

FOREIGN PATENTS

| | | |
|---|---|---|
| 449,060 | Great Britain | June 19, 1936 |